United States Patent
Frenkel

(10) Patent No.: US 7,283,583 B2
(45) Date of Patent: Oct. 16, 2007

(54) ADAPTIVE RATE TRANSMISSION WITH DUAL NOISE MARGINS

(75) Inventor: Liron Frenkel, Netanya (IL)

(73) Assignee: Tioga Technologies, Inc., San Jose, CA (US)

( * ) Notice: Subject to any disclaimer, the term of this patent is extended or adjusted under 35 U.S.C. 154(b) by 1139 days.

(21) Appl. No.: 10/024,048

(22) Filed: Dec. 14, 2001

(65) Prior Publication Data

US 2002/0118733 A1    Aug. 29, 2002

Related U.S. Application Data

(60) Provisional application No. 60/261,118, filed on Jan. 11, 2001.

(51) Int. Cl.
*H04B 1/38* (2006.01)
(52) U.S. Cl. ............... 375/219; 375/222; 375/232; 375/260; 370/401; 370/210; 370/310; 370/329; 455/522; 379/93.07
(58) Field of Classification Search ............... 375/222, 375/219, 232, 262, 260; 370/401, 210, 310, 370/329; 379/93.07; 455/522
See application file for complete search history.

(56) References Cited

U.S. PATENT DOCUMENTS

| | | | |
|---|---|---|---|
| 4,727,536 A | 2/1988 | Reeves et al. | |
| 4,860,283 A | 8/1989 | Takano et al. | |
| 5,212,687 A | 5/1993 | De La Bourdonnaye | |
| 5,420,888 A | 5/1995 | Davis et al. | |
| 5,668,857 A | * 9/1997 | McHale | 379/93.07 |
| 5,787,113 A | * 7/1998 | Chow et al. | 375/219 |
| 5,828,695 A | * 10/1998 | Webb | 375/219 |
| 5,835,536 A | 11/1998 | May et al. | |
| 5,999,355 A | 12/1999 | Behrens et al. | |
| 6,047,025 A | * 4/2000 | Johnson et al. | 375/232 |

(Continued)

FOREIGN PATENT DOCUMENTS

WO    WO-00/72496 A1 * 11/2000

OTHER PUBLICATIONS

Draft Recommendation G.991.2 of the International Telecommunications Union (ITU), entitled "Single-Pair High-Speed Digital Subscriber Line (SHDSL) Transceivers", Jan. 2001.

(Continued)

*Primary Examiner*—Chieh M. Fan
*Assistant Examiner*—Sudhanshu C. Pathak
(74) *Attorney, Agent, or Firm*—Blakely Sokoloff Taylor & Zafman

(57) ABSTRACT

A method for adaptive-rate communication includes setting a first target signal margin with respect to an actual noise level and a second target signal margin with respect to a predetermined noise level. The actual noise level is measured at a receiver on a communication channel between a transmitter and the receiver. A transmission rate is selected at which to transmit a signal on the channel such that for the selected transmission rate, a first signal-to-noise ratio (SNR) of the signal relative to the measured actual noise level is greater than a baseline SNR level by at least the first target signal margin, and a second SNR of the signal relative to the predetermined noise level is greater than the baseline SNR by at least the second target signal margin.

22 Claims, 5 Drawing Sheets

U.S. PATENT DOCUMENTS

| | | |
|---|---|---|
| 6,061,410 A | 5/2000 | Linz |
| 6,081,502 A * | 6/2000 | Paneth et al. ............... 370/210 |
| 6,128,348 A | 10/2000 | Kao et al. |
| 6,141,372 A | 10/2000 | Chamers |
| 6,240,132 B1 | 5/2001 | Yedid |
| 6,266,348 B1 | 7/2001 | Gross et al. |
| 6,266,395 B1 | 7/2001 | Liu et al. |
| 6,351,509 B1 * | 2/2002 | Vitenberg et al. ........... 375/377 |
| 6,359,934 B1 * | 3/2002 | Yoshida ...................... 375/262 |
| 6,363,109 B1 * | 3/2002 | Polley et al. ............... 375/222 |
| 6,385,203 B2 * | 5/2002 | McHale et al. ............. 370/401 |
| 6,385,462 B1 * | 5/2002 | Baum et al. ................ 455/522 |
| 6,445,773 B1 | 9/2002 | Liang et al. |
| 6,480,477 B1 | 11/2002 | Treadaway et al. |
| 6,496,540 B1 | 12/2002 | Widmer |
| 6,504,869 B2 | 1/2003 | Yedid |
| 6,704,324 B1 | 3/2004 | Holmquist |
| 6,804,211 B1 * | 10/2004 | Klein et al. ................. 370/329 |
| 2002/0031197 A1 | 3/2002 | Yedid |
| 2002/0110187 A1 | 8/2002 | May |
| 2002/0110210 A1 | 8/2002 | May et al. |
| 2002/0110213 A1 | 8/2002 | May et al. |
| 2006/0126549 A1 * | 6/2006 | Bourlas et al. ............. 370/310 |
| 2006/0188035 A1 * | 8/2006 | Tzannes ..................... 375/260 |

OTHER PUBLICATIONS

Moss, et al., in ITU Temporary Document CF-042, entitled "G.shdsl: Proposed PMMS Target Margin", Clearwater, Florida, Jan. 2001.

The Final Draft of ITU Standard G.991.2, Apr. 2001.

* cited by examiner

ADAPTIVE RATE TRANSMISSION WITH DUAL NOISE MARGINS

CROSS-REFERENCE TO RELATED APPLICATION

This application claims the benefit of U.S. Provisional Patent Application No. 60/261,118, filed Jan. 11, 2001, which is incorporated herein by reference.

FIELD OF THE INVENTION

The present invention relates generally to methods and systems for digital data communications, and specifically to adaptive determination of digital communication rates based on line conditions.

BACKGROUND OF THE INVENTION

Adaptive-rate transmission systems are known in the art of data communications. Modems used in such systems vary their transmission rates depending on the noise conditions of the communication channel. Typically, the transmission rate is determined at the initiation of communications between a pair of modems, using an agreed-upon startup protocol to assess the line conditions and choose the maximum transmission rate that will satisfy a minimal signal-to-noise ratio (SNR) criterion. Equivalently, the rate may be chosen so that the bit error rate (BER) does not exceed a predetermined maximum.

During an extended communication session, noise conditions on the communication channel are likely to change. For example, in a central office (CO) with many modems serving multiple subscriber lines, near-end crosstalk (NEXT) and far-end crosstalk (FEXT) can increase dramatically during a session due to communication activity on other lines. If the noise increase is too great, it will cause the modems to lose synchronization. When this occurs, it is necessary to repeat the startup protocol (referred to as "retraining") in order to determine a new, lower transmission rate. To avoid this situation, startup protocols typically specify a target signal margin, and the transmission rate is chosen so that the measured SNR exceeds a baseline SNR by at least the specified margin. The "baseline SNR" is generally the SNR for which the modem is expected to operate with the maximum allowed BER. Choosing the appropriate margin involves a tradeoff between reducing the likelihood of synchronization loss when the noise increases, and maximizing the exploitation of available channel bandwidth under current noise conditions.

Adaptive rate transmission with a startup training protocol is used in various types of Digital Subscriber Line (DSL) systems, including Single-pair High-speed DSL (SHDSL), as described in Draft Recommendation G.991.2 of the International Telecommunications Union (ITU), entitled "Single-Pair High-Speed Digital Subscriber Line (SHDSL) Transceivers" (January, 2001), which is incorporated herein by reference. As described in the Draft Recommendation, the central office modem (STU-C) and the customer premises modem (STU-R) carry out a power measurement modulation session (PMMS) at communication startup in order to decide on the communication rate. The target margin is fixed in this Draft Recommendation.

Moss et al. propose a standard procedure for specifying the target margin parameter for SHDSL in ITU Temporary Document CF-042, entitled "G.shdsl: Proposed PMMS Target Margin" (Clearwater, Fla., January, 2001), which is incorporated herein by reference. The authors point out that target margin can be specified relative to either current line conditions or to expected worst-case conditions. Because current line conditions can change in the course of a session, as noted above, Moss et al. suggest that the target margin should be based on the expected worst case and put forth standard worst-case parameters for SHDSL service. In practice, however, the worst-case noise varies substantially from one telephone system to another. Even within a given system, the worst-case noise can change over time as the central office adds to or replaces its existing DSL infrastructure. Furthermore, there may be situations in which the actual noise is worse than the standard "worst case," with the result that the modem will be unable to operate at the rate that was selected according to the worst-case model.

FIG. 1 and 2 schematically shows typical long-loop transmission spectra for Frequency-Domain-Multiplexed Asymmetric DSL (FDM-ADSL) modems and SHDSL modems, respectively. As can be seen in the figures, FDM-ADSL uses separate upstream and downstream transmission bands, while SHDSL uses the same band for both upstream and downstream transmission. The practical reach of DSL modems is often limited to less than 18,000 feet, even for the lowest rates. FDM-ADSL modems in particular are reach-limited, mainly due to two reasons: (1) FDM uses only a part of the frequency band in each transmission direction (because upstream and downstream are transmitted in non-overlapping frequency bands). (2) ADSL operates over Plain Old Telephone Service (POTS), and therefore does not use the lower 25 kHz band. In a long loop, in particular, only the lower frequencies are used, since attenuation is very high at higher frequencies.

Symmetrical services, such as SHDSL, use echo cancellation, and therefore are not limited by point (1) above. Also, since they do not operate over POTS, they are not limited by point (2). Therefore, SHDSL modems, using appropriate echo cancellation schemes, have better reach in laboratory conditions than do FDM-ADSL modems.

In the field, however, SHDSL modems are limited by another factor, which does not limit ADSL: self-NEXT. In the central office, as mentioned above, SHDSL receiver performance is impaired by NEXT induced by the other SHDSL modems, since transmission and reception are performed in the same frequency band. When the central office is loaded with SHDSL services, self-NEXT is the limiting factor in transmission rate performance. DSL standards typically assume that the NEXT noise level encountered by the customer premises equipment (CPE) is close to the noise level at the central office (CO). In many cases, however, NEXT noise at the customer premises is much lower than in the central office. This point is exploited by aspects of the present invention.

SUMMARY OF THE INVENTION

It is an object of the present invention to provide improved devices and methods for adaptive-rate data communications.

It is a further object of some aspects of the present invention to provide an improved method for determining a data transmission rate to use at start-up of a communication channel.

In preferred embodiments of the present invention, two target margins are specified for the purpose of determining the transmission rate to use in a communication session: an actual-noise margin and a worst-case margin. At startup of the session, the actual noise is measured, as is the signal level at each of a range of possible transmission rates. The actual SNR is computed using the actual noise measurement, while a worst-case SNR is computed using a predetermined worst-case noise level. At the conclusion of the startup procedure, the transmission rate is chosen to be the highest rate that gives a worst-case SNR that is greater than the baseline SNR by at least the worst-case margin, and an actual SNR which is greater than the baseline SNR by at least the actual-noise margin.

The use of two margins in this manner enables a communication system operator to configure the modems optimally for the conditions of his particular system. The operator can thus achieve maximum bandwidth utilization while minimizing the incidence of synchronization loss and consequent retraining. For example, when the system noise environment is generally stable, the operator can set a low (or even negative) worst-case noise margin so that the choice of transmission rate is determined by the actual noise. Conversely, when noise fluctuations are large, the operator can choose a low actual-noise margin, so that the transmission rate is dominated by the worst-case conditions.

In some preferred embodiments of the present invention, the worst-case noise level is based on standard worst-case parameters, as proposed by Moss et al. Alternatively, in other preferred embodiments, the worst-case noise level is based on actual noise measurements, made on multiple links and/or multiple different times in the communication system in question, so that a more realistic worst-case model is achieved. For this purpose, during the startup procedure, the receiver at the customer premises preferably conveys its measurement of the actual noise or other noise-related parameters back to the transmitter in the central office. The central office equipment uses this information to calculate or update its worst-case noise level.

In a preferred embodiment of the present invention, bit loading of the upstream signal is reduced when the NEXT noise at the customer premises is lower than the NEXT noise at the central office. Thus, while the upstream and downstream baud rates are identical, as mandated by standards such as SHDSL, the upstream bit rate may be reduced so that the BER at the central office receiver remains within acceptable bounds. (Since in most cases, the downstream data volume is considerably greater than the upstream volume, reducing the upstream bit loading does not substantially affect communication performance.) In the specific case of SHDSL, the upstream bit loading can be reduced from 3 bits/symbol to 2 or 1 bit/symbol. The worst-case margin and the actual-noise margin of the upstream receiver at the CO, are accordingly increased by 6dB for 2 bit/symbol, and by 12 dB for 1 bit/symbol. For upstream-limited systems, the reduced bit loading enables much longer reach. Other characteristics of SHDSL, such as the transmission mask and coding, do not have to be changed.

Although preferred embodiments are described herein with specific reference to SHDSL, the principles of the present invention are also applicable to other modems types. For example, aspects of the present invention may be applied to Symmetric DSL (SDSL) modems, based on specifications of the European Telecommunication Standards Institute (ETSI), as well as HDSL2 modems, as specified by the American National Standards Institute (ANSI).

There is therefore provided, in accordance with a preferred embodiment of the present invention, a method for adaptive-rate communication, including:

setting a first target signal margin with respect to an actual noise level and a second target signal margin with respect to a predetermined noise level;

measuring the actual noise level at a receiver on a communication channel between a transmitter and the receiver; and selecting a transmission rate at which to transmit a signal on the channel such that for the selected transmission rate, a first signal-to-noise ratio (SNR) of the signal relative to the measured actual noise level is greater than a baseline SNR level by at least the first target signal margin, and a second SNR of the signal relative to the predetermined noise level is greater than the baseline SNR by at least the second target signal margin.

Preferably, the predetermined noise level includes a worst-case noise level, wherein the communication channel is one of a plurality of channels in a communication system, and wherein selecting the transmission rate includes calculating the worst-case noise level based on the measured actual noise level on the plurality of the channels, and setting the transmission rate so that the level of the signal is greater than the calculated worst-case noise level by at least the second target signal margin. Most preferably, measuring the actual noise level includes conveying an indication of the actual noise level from the receiver to the transmitter for use in calculating the worst-case noise level.

Additionally or alternatively, selecting the transmission rate includes selecting a maximum rate among a plurality of available rates on the channel at which the first SNR is greater than the baseline SNR level by at least the first target signal margin, and the second SNR is greater than the baseline SNR level by at least the second target signal margin. Preferably, selecting the maximum rate includes measuring the level of the signal at each of the plurality of the available rates, and choosing the maximum rate based on the measured level of the signal. Most preferably, the method includes conveying from the receiver to the transmitter an indication of which of the available rates can be used on the channel, based on the measured levels of the noise and the signal at the plurality of the rates, and selecting the transmission rate includes selecting the transmission rate at the transmitter based on the indication.

In a preferred embodiment, selecting the transmission rate includes selecting the rate at which to transmit a digital subscriber line (DSL) signal between a central office and customer premises, wherein the DSL signal most preferably includes a Single-pair High-speed DSL (SHDSL) signal.

In a further preferred embodiment, selecting the transmission rate includes setting a variable bit-loading rate for the symbols to be transmitted on the channel.

There is also provided, in accordance with a preferred embodiment of the present invention, communication apparatus, including:

a transmitter, configured to transmit a signal over a communication channel at a transmission rate; and a receiver, adapted to receive the signal over the communication channel, and further adapted to measure an actual noise level on the communication channel, and to cause the transmission rate at which the transmitter is to transmit the signal to be selected such that for the selected transmission rate, a first signal-to-noise ratio (SNR) of the signal relative to the measured actual noise level is greater than a baseline SNR level by at least a first target signal margin, and a second SNR of the signal relative to a predetermined noise level is greater than the baseline SNR by at least a second target signal margin.

There is additionally provided, in accordance with a preferred embodiment of the present invention, a method for bi-directional communication, including:

transmitting single-carrier signals comprising data symbols between first and second Digital Subscriber Line (DSL) modems over a communication channel in upstream and downstream directions within respective upstream and downstream transmission spectra that are at least partly mutually overlapping; and setting different, respective bit-loading rates for the symbols in the upstream and downstream directions, responsive to conditions on the channel.

In a preferred embodiment, setting the bit-loading rates includes setting the upstream bit-loading rate, for the symbols transmitted from the second modem to the first modem, to a lower value than the downstream bit-loading rate, for the symbols transmitted from the first modem to the second modem, responsive to a noise level at the first modem being higher than the noise level at the second modem. Preferably, setting the bit-loading rates includes setting the rates based on the noise level determined before transmitting the signals.

Alternatively, transmitting the single-carrier signals includes transmitting the signals upstream with a range of different values of the upstream bit-loading rate, and setting the bit-loading rates includes selecting a maximum value of the upstream bit-loading rate in the range that meets a signal-to-noise (SNR) ratio margin criterion at a selected baud rate. Preferably, transmitting the data symbols includes transmitting the symbols in the upstream and downstream directions at substantially the same baud rate, which is selected adaptively based on a minimum value of the upstream bit-loading rate in the range.

Preferably, transmitting the data symbols includes transmitting the symbols in the upstream and downstream directions at substantially the same baud rate and using a standard modulation scheme common to the upstream and downstream directions.

There is further provided, in accordance with a preferred embodiment of the present invention, apparatus for bi-directional communication, including first and second Digital Subscriber Line (DSL) modems, mutually linked by a communication channel, the first modem being adapted to transmit downstream over the communication channel to the second modem a first single-carrier signal having a downstream transmission spectrum, the first single-carrier signal comprising first data symbols and having a downstream bit-loading rate, and the second modem being adapted to transmit upstream over the communication channel to the first modem a second single-carrier signal having an upstream transmission spectrum that at least partly overlaps the downstream transmission spectrum, the second single-carrier signal comprising second data symbols with an upstream bit-loading rate lower than the downstream bit-loading rate, wherein the upstream and downstream bit-loading rates are selected responsive to conditions on the channel.

The present invention will be more fully understood from the following detailed description of the preferred embodiments thereof, taken together with the drawings in which:

DETAILED DESCRIPTION OF PREFERRED EMBODIMENTS

Figure 1:
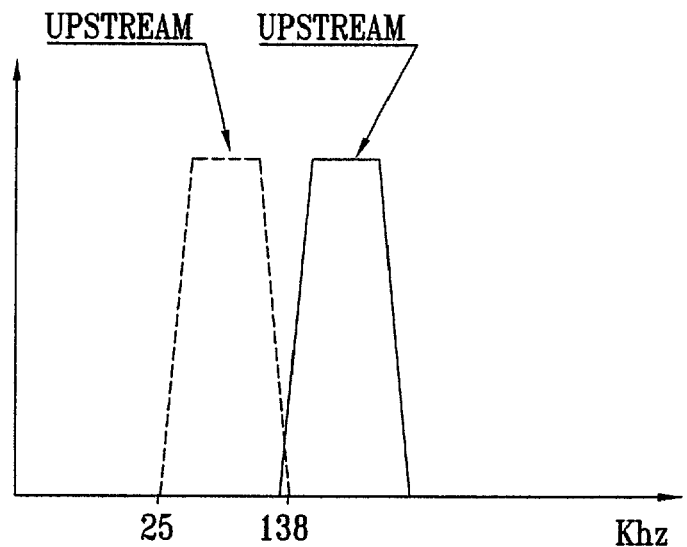
FIG. 1 is a schematic illustration of a typical long-loop transmission spectra for a Frequency-Domain-Multiplexed Asymmetric Digital Subscriber Line (FDM-ADSL) modem, as is known in the art.
Figure 2:
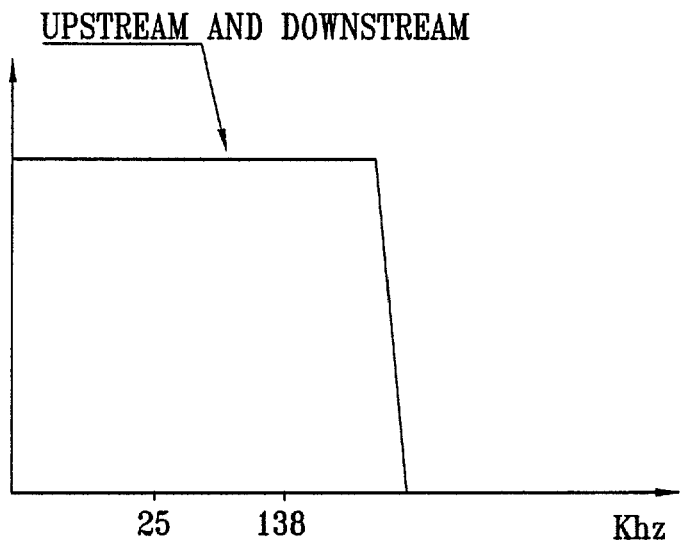
FIG. 2 is a schematic illustration of a typical long-loop transmission spectra for a Single-pair High-speed Digital Subscriber Line (SHDSL) modem, as is known in the art.
Figure 3:
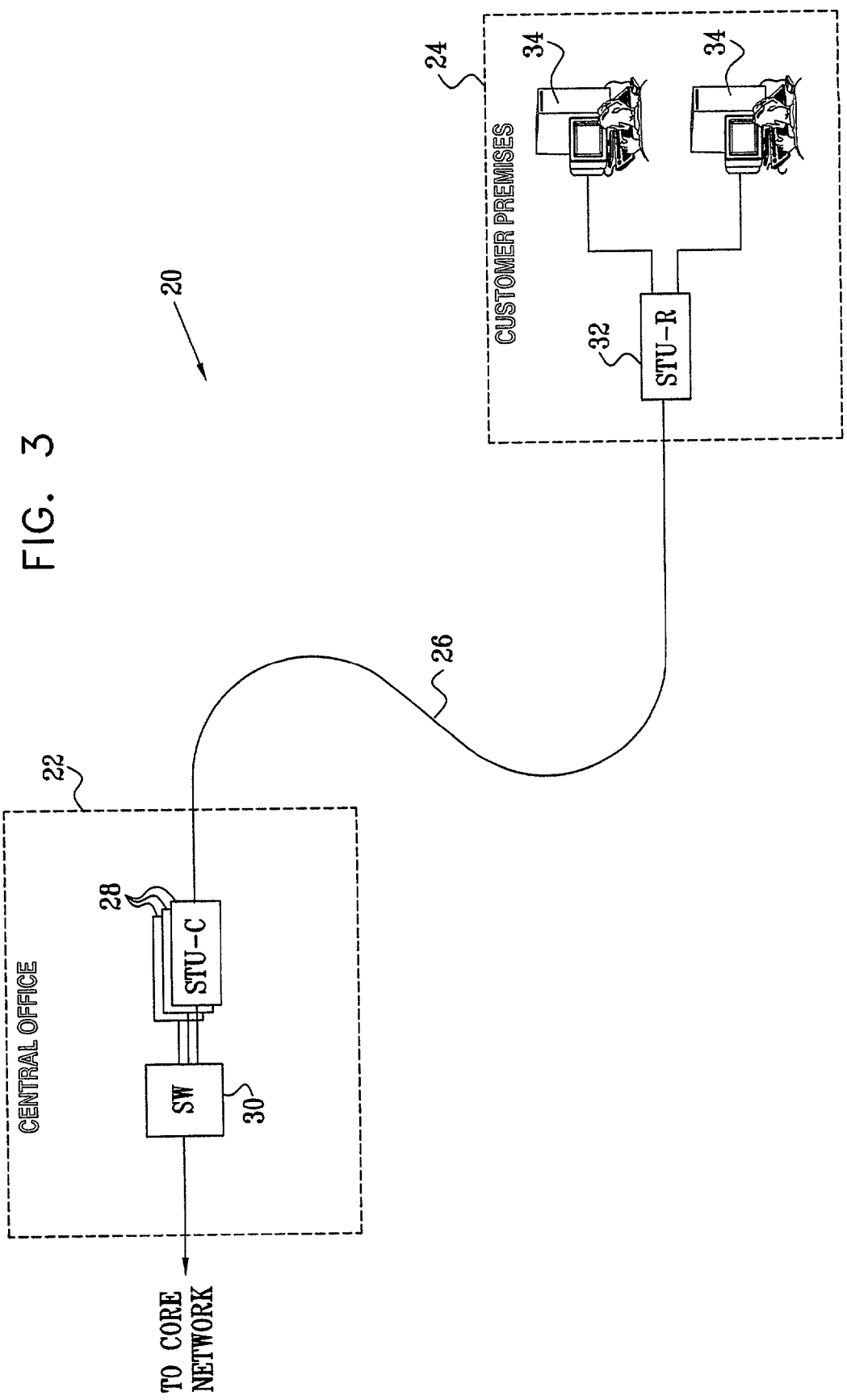
FIG. 3 is a block diagram that schematically illustrates an adaptive-rate data communication system, in accordance with a preferred embodiment of the present invention.

FIG. 3 is a block diagram that schematically illustrates a SHDSL communication system 20, in accordance with a preferred embodiment of the present invention. A central office 22 serves a plurality of customer premises 24 over respective communication channels 26. For the sake of simplicity, only a single customer premises and communication channel are shown. The communication channel typically comprises conventional twisted-pair wire, as is generally used in telephone infrastructure.

Central office 22 comprises central office modems 28, referred to as STU-C, coupled by switching circuitry 30 to a core data network. At customer premises 24, each channel 26 terminates at a customer premises modem 32, referred to as STU-R, which serves one or more pieces of customer premises equipment (CPE) 34. At startup of a communication session, modems 28 and 32 carry out a PMMS training procedure, as described in detail hereinbelow, to set the transmission rate that they will use during the session. The modulation scheme used in SHDSL is coded pulse amplitude modulation (PAM), with three bits/symbol. The transmission rate determines the signaling period, so that when the rate is reduced, the period increases, and symbols are sent over longer time intervals.

Figure 4:
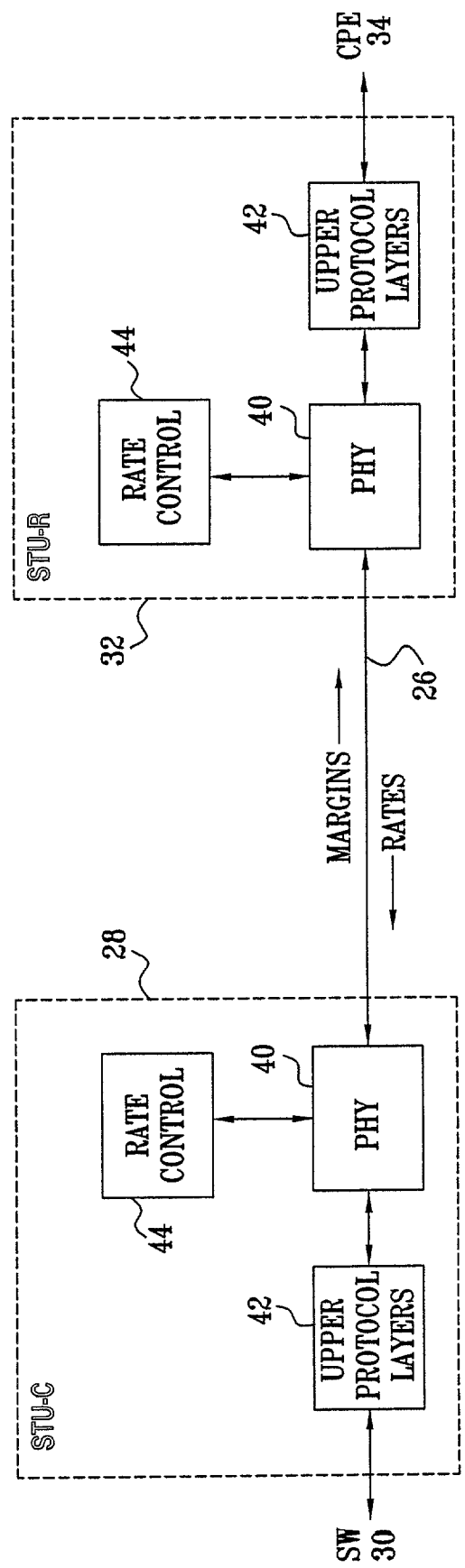
FIG. 4 is a block diagram that schematically shows details of a pair of modems used in the system of FIG. 3, in accordance with a preferred embodiment of the present invention.

FIG. 4 is a block diagram that shows functional details of modems 28 and 30, in accordance with a preferred embodiment of the present invention. Each of the modems interfaces with channel 26 via a physical layer interface (PHY) 40, which generates and decodes the PAM symbols. Media access control and other upper-layer protocol functions are carried out by protocol processors 42.

The transmission rates of the physical layer interfaces are controlled by rate control circuitry 44. At the STU-R, rate control circuitry 44 also controls the upstream bit loading, i.e., the number of bits per symbol (typically 1-3 bits/symbol) transmitted by the physical layer interface. In practice, the rate control circuitry typically comprises an embedded or general-purpose microprocessor, which may also carry out other functions required by the modem. The rate control circuitry in central office modem (STU-C) 28 is programmed with actual-noise and worst-case target margins, and preferably with the upstream bit loading values, by an operator of central office 22. STU-C conveys these values to customer premises modem (STU-R) 32 at the beginning of the startup procedure. Modem 32 uses the margins to determine the transmission rate for the communication session, and communicates these rates back to modem 28.

Figure 5:
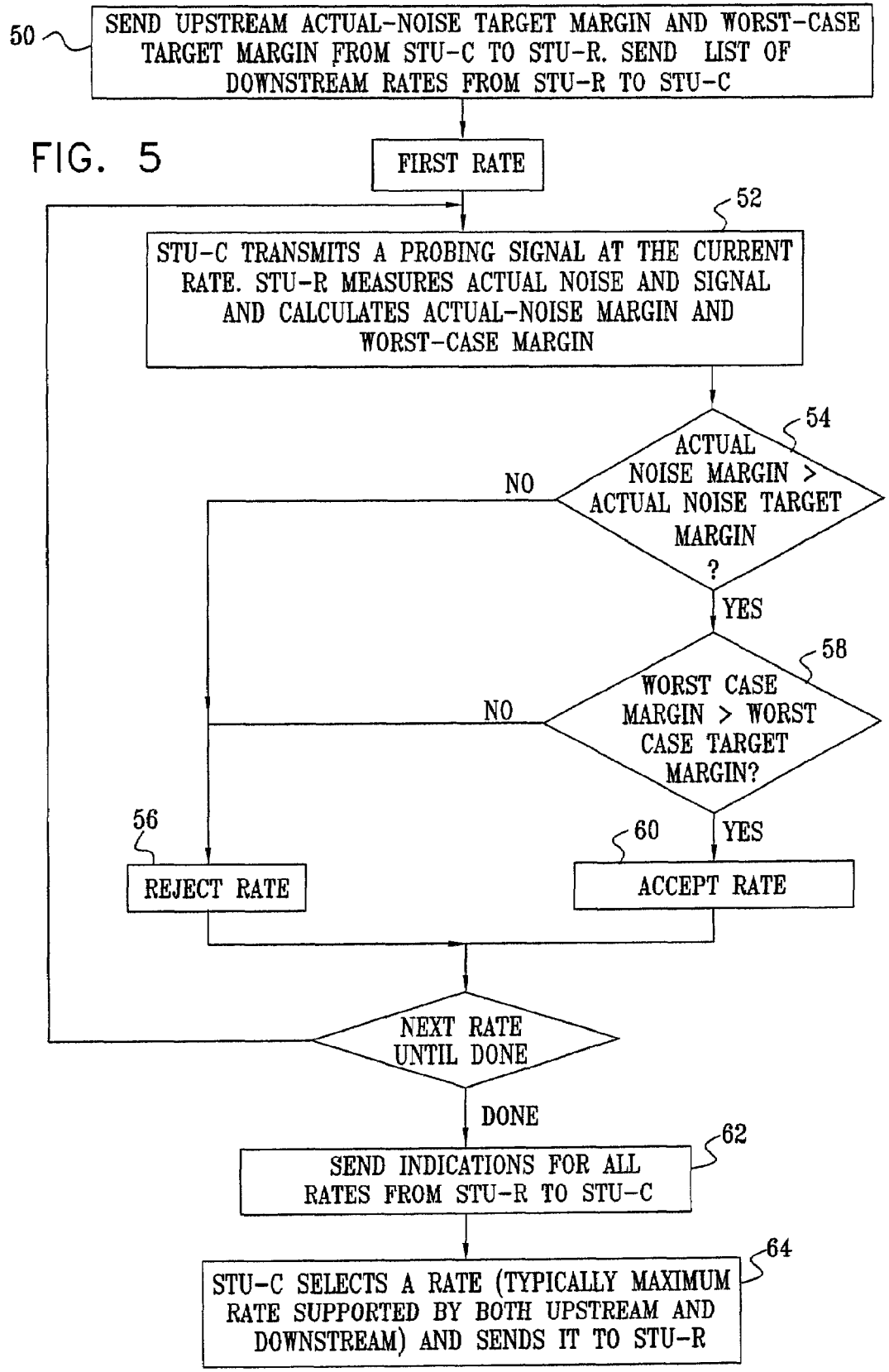
FIG. 5 is a flow chart that schematically illustrates a method for adaptively determining a downstream transmission rate, in accordance with a preferred embodiment of the present invention.

FIG. 5 is a flow chart that schematically illustrates a method for adaptively determining the transmission rate for communications between modems 28 and 32, in accordance with a preferred embodiment of the present invention. This procedure is preferably carried out in both directions: downstream (from STU-C to STU-R) and upstream (from STU-R to STU-C) to determine maximum supportable upstream and downstream transmission rates under the given worst-case and actual-noise conditions. Typically, the maximum rate that is supported in both upstream and downstream directions is chosen as the transmission rate to use in both directions. For convenience, only the downstream procedure is shown in detail in FIG. 5.

To begin the procedure, once the communication channel is opened, STU-C sends to STU-R the actual-noise and worst-case target margins to be used in determining the transmission rate, at a margin transmission step 50. STU-R also sends a list of possible downstream rates to STU-C. The target margins, typically expressed in dB, specify the amount by which the operating SNR at the chosen transmission rate must exceed a baseline SNR that is determined for the measured or worst-case noise level, respectively. Preferably, the baseline SNR is chosen to be the SNR level at which the channel will have a bit error rate (BER) of $10^{-7}$. In the SHDSL system, for example (given 5.1 dB of coding gain provided by the coding scheme used in the system), the baseline SNR for bit loading of 3 bits/symbol is 22.6 dB. If lower bit loading is used, the baseline is reduced by 6 dB for each bit that is reduced. Of course, different maximum BER levels may be specified, and different coding schemes will give different baseline SNR levels.

Optionally, at step 50, STU-C also sends to STU-R the worst-case noise level to be used in the subsequent SNR margin calculation. While the actual noise level is measured, as described below, the worst-case noise level is typically a standard value, such as that specified in the Final Draft of ITU standard G.991.2 (April, 2001), which is incorporated herein by reference. (See particularly Table A-13 in section A.5.16, page 115.) This worst-case level is based on a model that includes a large number of other nearby communication sessions, which disturb channel 26 with NEXT and FEXT interference. Under certain conditions, such as when the actual noise conditions in system 20 are known to be stable, or it is known that there will be considerably fewer disturbers than in the worst case, the worst-case target margin can be set to a low or even negative value. In this case, STU-R will effectively ignore the worst-case margin in setting the transmission rate. Alternatively, instead of using the standard worst-case noise level, the worst-case noise level can be determined based on the actual conditions prevailing in system 20, and conveyed to STU-R at step 50.

STU-C transmits test signals to STU-R over a range of candidate symbol rates, so that STU-R can measure the actual noise and the signal power at the different rates, at a measurement step 52. The noise is simply equal to the power spectral density (PSD) measured by the receiver when the transmitter is quiet. The test signals are preferably standard signals defined for this purpose with a nominal PSD mask, transmitted by STU-C at a predetermined power level. For SHDSL, nominal PSD masks are specified in section A.4 of the above-mentioned Final Draft of ITU standard G.991.2 (page 98). The receiver measures the received PSD to determine the channel attenuation at each candidate symbol rate.

For each of the candidate symbol rates, STU-R calculates the actual SNR, based on the measured signal PSD and the actual-noise PSD for each frequency, at an actual margin assessment step 54. Preferably, the SNR (in dB) for each symbol rate $f_{sym}$ is determined by integration over a range of relevant frequencies, most preferably using a formula such as the one given in section A.3.1.4 of the above-mentioned Final Draft of ITU standard G.991.2 (page 86):

$$SNR_{dB} = \frac{1}{M} \sum_{k=1}^{M} 10 \log_{10} \left\{ \begin{array}{l} 1 + \frac{S_R(f_{sym} - f_k)}{N(f_{sym} - f_k)} + \frac{S_R(f_k)}{N(f_k)} + \\ \frac{S_R(2f_{sym} - f_k)}{N(2f_{sym} - f_k)} + \frac{S_R(f_{sym} + f_k)}{N(f_{sym} + f_k)} \end{array} \right\} \quad (1)$$

In this equation, $S_R(f)$ is the PSD measured at the receiver at frequency f, which is equal to the product of the transmitted signal PSD, S(f), and the squared magnitude of the loop insertion function of the channel, H(f), i.e., $SR(f)=S(f)|H(f)|^2$. N(f) is the measured noise. $f_k=1000k$, and M is chosen such that $M \times 1000 < f_{sym} < (M+1) \times 1000$. Alternatively, other measures of SNR may be used.

The actual margin is given by the difference between $SNR_{dB}$ and the baseline SNR value (preferably 22.6 dB, as noted above). If the actual margin for a given symbol rate is less than the actual-noise (A-N) target margin specified at step 50, this symbol rate is rejected, at a rate rejection step 56.

A similar computation is performed with respect to the worst-case noise level, at a worst-case margin assessment step 58. At this step, the worst-case SNR is determined for each of the candidate symbol rates, preferably based on formula (1) above, using the worst-case noise PSD for each frequency in place of the actual measured noise. The worst-case margin is given in this case by the difference between the worst-case SNR and the baseline SNR value. If the worst-case margin for a given symbol rate is less than the worst-case-noise (W-C) target margin specified at step 50, this symbol rate is rejected. Only if both the actual and worst-case margins are satisfied is the symbol rate, accepted, at an acceptance step 60.

Based on the results of steps 54 and 58, STU-R returns an indication to STU-C of the symbol rates that can be used on the channel, at a rate reporting step 62. The indication is preferably in the form of a set of indication bits, one for each symbol rate evaluated. Each bit indicates whether both the actual-noise margin and worst-case margin exceeded the respective target margins at the corresponding rate. Based on this information, STU-C selects the rate for subsequent use as the transmission rate on channel 26, at a transmission rate selection step 64, and sends the selected rate to STU-R. The transmission rate should be no greater than the minimum of the actual-noise rate and the worst-case rate. In the final rate selection, the STU-C can also take into consideration other factors, such as the maximum rate promised to a specific customer, maximum rate supported for the upstream link, and specific rates that are not supported by the STU-C modem. Typically, STU-C selects the maximum rate that is supported in both the upstream and downstream directions.

Alternatively or additionally, other information regarding the actual noise and other channel conditions is also sent, such as the measured noise and signal PSD at different symbol rates, and possibly at different frequency points, as well. At central office 22, the rates and other information reported by STU-R are used in monitoring performance of system 20 and, most preferably, in determining an accurate worst-case model based on the actual conditions prevailing in the system. For example, if the worst-case rate is consistently lower than the actual-noise rate, it may be desirable to reduce the worst-case noise level or to relax the worst-case target margin, so that available bandwidth is better exploited.

Figure 6:
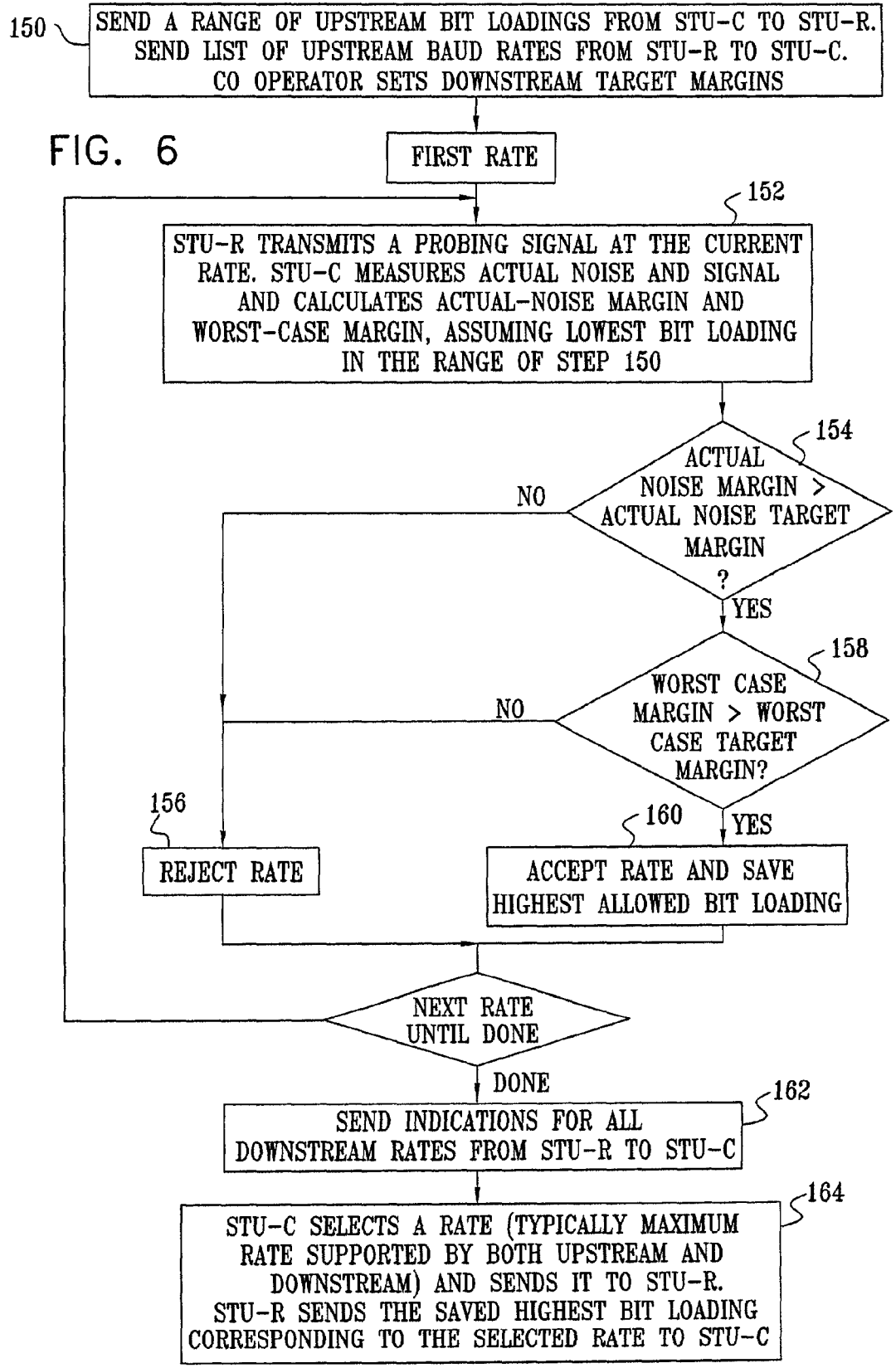
FIG. 6 is a flow chart that schematically illustrates a method for adaptively determining an upstream transmission rate and bit-loading rate, in accordance with a preferred embodiment of the present invention.

FIG. 6 is a flow chart that schematically illustrates a method for adaptively determining the upstream transmission rate for communications between modems 32 and 28, in accordance with a preferred embodiment of the present invention. The upstream procedure is largely similar to the downstream procedure illustrated by FIG. 5, and only the salient difference will be described hereinbelow. The main difference in the upstream procedure is the optional use of lower bit loading.

The desired bit loading can be conveyed from STU-C to STU-R at the initiation of the method (i.e., at a range transmission step 50), or it can be determined in advance. Its value can be based on a priori estimation of the worst case noise at the central office compared to the customer premises. For example, if the worst-case central office noise (in the frequency range of the transmission) is expected to be 6 dB higher than that at the customer premises, then the bit loading in the upstream direction is preferably reduced by a single bit compared to the downstream, in order to allow maximum reach under worst case conditions.

Alternatively, the bit loading can be set adaptively, as illustrated in FIG. 6. In this case, at the initiation of the method, at range transmission step 50, a range of bit loading values can be conveyed from STU-C to STU-R (for example, a range from 1 to 3 bits). In a measurement step 152, the actual noise margin and worst case margin are calculated for the lowest bit loading in the range. The computation is substantially similar to that described above with reference to step 52, with the exception that 6 dB are deducted from the baseline SNR for each bit that is reduced in the bit loading. If either margin is not satisfied for a given rate, that rate is rejected at a rejection step 156. Only if both margins are greater than the corresponding target margins (that is, the conditions of an actual margin assessment step 154 and a worst-case margin assessment step 158 are met), is the rate accepted, at an acceptance step 160.

The highest allowed bit loading at the accepted rate is also saved at step 160. This bit loading is the highest bit loading for which the conditions of steps 154 and 158 hold (wherein the worst case margin and the actual noise margin are calculated using a baseline SNR corresponding to the bit loading, as noted above). STU-R sends an indication to STU-C of the downstream rates that can be used on the channel, at a rate reporting step 162. Then, at a rate selection step 164, STU-C selects the symbol rate to be used and sends the selected rate to STU-R. STU-R sends back the highest allowed bit loading for the selected rate, based on the results that it saved at step 160.

Although preferred embodiments are described herein with specific reference to SHDSL, the principles of the present invention may similarly be applied in other communication systems that use adaptive-rate transmission. It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for adaptive-rate communication, comprising:
    setting a first target signal margin with respect to an actual noise level and a second target signal margin with respect to a predetermined noise level;
    measuring the actual noise level at a receiver on a communication channel between a transmitter and the receiver; and
    selecting a transmission rate at which to transmit a signal on the channel such that for the selected transmission rate, a first signal-to-noise ratio (SNR) of the signal relative to the measured actual noise level is greater than a baseline SNR level by at least the first target signal margin, and a second SNR of the signal relative to the predetermined noise level is greater than the baseline SNR by at least the second target signal margin.

2. A method according to claim 1, wherein the predetermined noise level comprises a worst-case noise level.

3. A method according to claim 2, wherein the communication channel is one of a plurality of channels in a communication system, and wherein selecting the transmission rate comprises calculating the worst-case noise level based on the measured actual noise level on the plurality of the channels, and setting the transmission rate so that the level of the signal is greater than the calculated worst-case noise level by at least the second target signal margin.

4. A method according to claim 3; wherein measuring the actual noise level comprises conveying an indication of the actual noise level from the receiver to the transmitter for use in calculating the worst-case noise level.

5. A method according to claim 1, wherein selecting the transmission rate comprises selecting a maximum rate among a plurality of available rates on the channel at which the first SNR is greater than the baseline SNR level by at least the first target signal margin, and the second SNR is greater than the baseline SNR level by at least the second target signal margin.

6. A method according to claim 5, wherein selecting the maximum rate comprises measuring the level of the signal at each of the plurality of the available rates, and choosing the maximum rate based on the measured level of the signal.

7. A method according to claim 6, and comprising conveying from the receiver to the transmitter an indication of which of the available rates can be used on the channel, based on the measured levels of the noise and the signal at the plurality of the rates, and wherein selecting the transmission rate comprises selecting the transmission rate at the transmitter based on the indication.

8. A method according to claim 1, wherein selecting the transmission rate comprises selecting the rate at which to transmit a digital subscriber line (DSL) signal between a central office and customer premises.

9. A method according to claim 8, wherein the DSL signal comprises a Single-pair High-speed DSL (SHDSL) signal.

10. A method according to claim 1, wherein selecting the transmission rate comprises setting a variable bit-loading rate for the symbols to be transmitted on the channel.

11. A method according to claim 10, wherein selecting the transmission rate comprises setting a baud rate to be used for both upstream and downstream transmissions on the channel, and wherein setting the variable bit-loading rate comprises setting different, respective bit-loading rates for the upstream and downstream transmissions.

12. Communication apparatus, comprising:
a transmitter, configured to transmit a signal over a communication channel at a transmission rate; and
a receiver, adapted to receive the signal over the communication channel, and further adapted to measure an actual noise level on the communication channel, and to cause the transmission rate at which the transmitter is to transmit the signal to be selected such that for the selected transmission rate, a first signal-to-noise ratio (SNR) of the signal relative to the measured actual noise level is greater than a baseline SNR level by at least a first target signal margin, and a second SNR of the signal relative to a predetermined noise level is greater than the baseline SNR by at least a second target signal margin.

13. Apparatus according to claim 12, wherein the predetermined noise level comprises a worst-case noise level.

14. Apparatus according to claim 13, wherein the communication channel is one of a plurality of channels in a communication system, and wherein the worst-case noise level is calculated based on the measured actual noise level on the plurality of the channels.

15. Apparatus according to claim 14, wherein the receiver is adapted to convey an indication of the actual noise level to the transmitter for use in calculating the worst-case noise level.

16. Apparatus according to claim 12, wherein the transmission rate is selected to be a maximum rate among a plurality of available rates on the channel at which the first SNR is greater than the baseline SNR level by at least the first target signal margin, and the second SNR is greater than the baseline SNR by at least the second target signal margin.

17. Apparatus according to claim 16, wherein the receiver is adapted to measure the level of the signal at each of the plurality of the available rates, and wherein the maximum rate is chosen based on the measured level of the signal.

18. Apparatus according to claim 17, wherein the receiver is adapted to convey to the transmitter an indication of which of the available rates can be used on the channel, based on the measured levels of the noise and the signal at the plurality of the rates for use by the transmitter in selecting the transmission rate.

19. Apparatus according to claim 12, wherein the communication channel comprises a digital subscriber line (DSL) link between a central office and customer premises.

20. Apparatus according to claim 19, wherein the DSL link comprises a Single-pair High-speed DSL (SHDSL) link.

21. Apparatus according to claim 12, wherein the transmission rate is selected by setting a variable baud rate and setting a variable bit-loading rate for the symbols to be transmitted on the channel.

22. Apparatus according to claim 21, wherein the same baud rate is set for both upstream and downstream transmissions on the channel, while different, respective bit-loading rates are set for the upstream and downstream transmissions.

* * * * *